Figure 1:
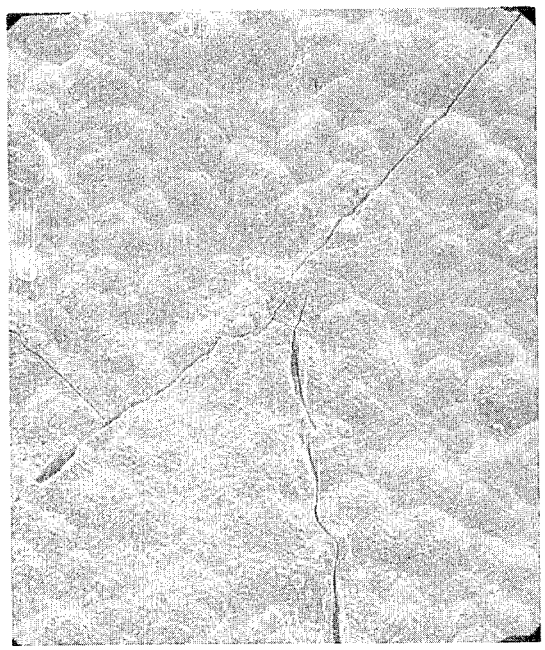

United States Patent [19]

McAllister et al.

[11] Patent Number: 4,837,073

[45] Date of Patent: Jun. 6, 1989

[54] BARRIER COATING AND PENETRANT PROVIDING OXIDATION PROTECTION FOR CARBON-CARBON MATERIALS

[75] Inventors: Lawrence E. McAllister, Granger; Norman E. Jannasch, South Bend, both of Ind.

[73] Assignee: Allied-Signal Inc., Morristown, N.J.

[21] Appl. No.: 31,626

[22] Filed: Mar. 30, 1987

[51] Int. Cl.$^4$ .......................... B32B 7/02; B32B 9/00; B32B 151/04; B05D 3/02

[52] U.S. Cl. .................................. 428/212; 428/220; 428/408; 428/457; 428/646; 428/332; 428/334; 427/343; 427/380

[58] Field of Search ............... 428/220, 368, 408, 698, 428/689, 704, 646, 457, 212; 427/249, 343, 379, 380; 420/557

[56] References Cited

U.S. PATENT DOCUMENTS

| | | | |
|---|---|---|---|
| 3,622,283 | 11/1971 | Sara | 428/646 X |
| 3,713,882 | 1/1973 | DeBrunner et al. | 428/408 |
| 4,275,095 | 6/1981 | Warren | 427/249 X |
| 4,396,677 | 8/1983 | Intrater et al. | 428/408 |
| 4,425,407 | 1/1984 | Galasso et al. | 428/368 |
| 4,465,777 | 8/1984 | Shuford | 501/88 |
| 4,471,023 | 9/1984 | Shuford | 428/408 |
| 4,472,476 | 9/1984 | Veltri et al. | 428/215 |
| 4,487,799 | 12/1984 | Galasso et al. | 427/249 X |
| 4,617,232 | 10/1986 | Chandler et al. | 428/408 X |
| 4,702,960 | 10/1987 | Ogman | 428/408 X |

FOREIGN PATENT DOCUMENTS

| | | |
|---|---|---|
| 2525207 | 10/1983 | France . |
| 76725 | 10/1975 | Poland . |
| 865320 | 4/1961 | United Kingdom . |

OTHER PUBLICATIONS

Strangman, Thomas E., and Robert J. Keiser, "*Interstitially Protected Oxidation Resistant Carbon-Carbon Composites*", Invention Evaluation Questionnaire, application Ser. No. 576,081, filed Feb. 1, 1984, National Technical Information Service, Feb., 1984.

NASA Technical Note TN D-7688, Jun. 1974, "*Effect of Chlorine Purification on Oxidation Resistance of Some Mechanical Carbons*", by D. W. Wisander and G. P. Allen.

Zhao, J. X., R. C. Bradt, and P. L. Walker, Jr., "*Effect of Air Oxidation at 873K on the Mechanical Porperties of a Carbon-Carbon Composiste,*" Carbon, vol. 23, No. 1, pp. 9-13, 1985.

Baranski, A., R. D. Ziembaj, C. Dunajewski, M. Lebiedziejewski, and K. Pawlowski, "*A Study of Oxidation of Graphite Electrode Material Before and After Impregnation with Salts*", Carbon, vol. 20, No. 5, pp. 401-408, 1982.

McKee, D. W., and C. L. Spiro, "*The Effect of Chlorine Pretreatment on the Reactivity of Graphite in Air*", Carbon, vol. 23, No. 4, pp. 437-444, 1985.

McKee, D. W., C. L. Spiro, and E. J. Lamby, "*The Effects of Boron Additives on the Oxidation Behavior of Carbon*", Carbon, vol. 22, No. 6, pp. 507-511, 1984.

Schlichting, J., "*Chemical Vapor Deposition of Silicon Carbide*", Powder Metallurgy International, vol. 12, No. 3, pp. 141-147 and 196-200, 1980.

McKee, D. W., C. L. Spiro, and E. J. Lamby, "The Inihibition of Graphite Oxidation by Phosphorus Additives", Carbon, vol. 22, No. 3, pp. 285-290, 1984.

*Primary Examiner*—Ellis P. Robinson
*Assistant Examiner*—Susan S. Rucker
*Attorney, Agent, or Firm*—Larry J. Palguta; Ken C. Decker

[57] ABSTRACT

The invention provides a method for utilizing the inherent oxygen-blocking characteristics of a barrier coating for a carbon-carbon material by penetrating cracked, porous areas of the coating with an oxygen inhibitor. The inhibitor will complex with active carbon-carbon material sites at the base of the cracks. The resulting system provides very effective oxidation protection at intermediate temperatures of approximately 650° C.

8 Claims, 1 Drawing Sheet

BARRIER COATING AND PENETRANT PROVIDING OXIDATION PROTECTION FOR CARBON-CARBON MATERIALS

This invention relates to a barrier coating and penetrant for providing oxidation protection for a carbon-carbon composite article, and particularly for carbon-carbon composite materials utilized in aircraft brakes.

Carbon-carbon composites are a class of unique materials whose properties, especially at elevated temperatures, make them attractive for various aerospace applications. The materials are composites, although all the composite elements are comprised essentially of carbon in its various allitropic forms. Carbon-carbon materials are known to oxidize beginning at about 400° C. (750° F.) and the oxidation becomes rapid by 650° C. (1200° F.). Factors such as the degree of graphitization, purity, pore structure, specific surface area, surface complexes, oxygen availibility and temperature have a strong influence on the oxidation of carbon materials. The oxidation of carbon-carbon composites at elevated temperatures in an atmospheric environment has a catastrophic effect on the mechanical properties of the composites. Some form of oxidation protection is required in order to maintain structural capability. One approach being used to provide protection is the application of a refractory ceramic barrier coating. SiC is a useful coating for this purpose and may be utilized for temperatures up to approximately 1400° C Various methods may be utilized in order to provide SiC coatings on various substrates including carbon-carbon composites and graphite. Chemical vapor deposition (CVD) is the primary coating method utilized. SiC formation by reaction of carbon substrates with Si-containing compounds has also been utilized. The conversion of carbon surfaces to SiC by chemical reaction is sometimes referred to as chemical vapor reaction (CVR).

The use of CVD SiC coatings for oxidation protection of carbon-carbon composites is known, as illustrated by Galasso et al. U. S. Pat. No. 4,425,407. Composite CVD SiC/$Si_3N_4$ coatings are described by Veltri et al. U. S. Pat. No. 4,472,476. Shuford U. S. Pat. No. 4,465,777 describes a refractory coating for carbon-carbon substrates formed by reacting a mixture of Si, SiC and Boron with the carbon-carbon substrate at temperatures up to 3300° F. The resulting "converted" surface or "primary" coating is porous. For enhanced protection from oxidation, a second coating based on silicate or phosphate solutions was applied.

An important factor that must be considered in the selection and application of a refractory barrier coating to a carbon-carbon substrate is the potential mismatch in the thermal expansion coefficient between the barrier coating and the carbon-carbon substrate. Refractory coatings or barrier coatings that have been applied to carbon-carbon composites have a high thermal expansion coefficient as compared to the substrate. During the initial cool-down from the coating application temperature, the high thermal contraction of the coating relative to the substrate generates tensile stresses in the coating, which results in extensive cracking. The degree of cracking will vary depending on the thermal expansion mismatch. High strength, high modulus, carbon-carbon composites have the lowest thermal expansion coefficient, which results in the greatest mismatch and the greatest tendency to crack. For applications near the maximum use temperature of coatings such as SiC and $Si_3N_4$ (approximately 1400° C.), the cracks in the coatings are closed, therefore providing good oxidation protection. However, at intermediate temperatures (approximately 650° C.), the cracks are open and the carbon-carbon substrate is partially exposed to the oxidizing environment.

Another class of anti-oxidant treatments that is used for various carbon and graphite materials, including carbon-carbon substrates, is based on inhibiting elements that form a stable complex with active sites on the carbon site in order to prevent oxidation. Halogen and organohalogen compounds have been used as oxidation inhibitors at temperatures of up to 900° C. by forming stable halogen complexes on graphite surfaces. Phosphorus and boron compounds have also been reported to inhibit oxidation by adsorption on graphite surfaces. The boron compounds also form a glassy residue above 450° C. which further blocks active sites on carbon surfaces. It is known to use a concentrated aqueous solution of $H_3PO_4$ ZnO, $Al(OH)_3$, $CuSO_4$ and $Cu(NO_3)_2$ to inhibit oxidation of graphitized electrodes over the temperature range of 550°–750° C. Oxidation rates were reduced by a factor of 10.

The present invention provides a method and article which utilizes the inherent oxygen-blocking characteristics of a barrier coating for a carbon-carbon material by penetrating cracked, porous areas of the barrier coating with an oxidation inhibitor. The inhibitor will complex with active carbon sites on the carbon-carbon material at the base of the cracks. The resulting carbon-carbon substrate protected by the barrier coating and penetrant provides a very effective oxidation protection for intermediate temperatures of approximately 650° C. Also, the inhibitor may be applied directly to the carbon-carbon material in order to provide oxidation protection.

The foregoing, and other features and advantages of the present invention, will become more apparent from the following description and accompanying drawings.

Figure 2:
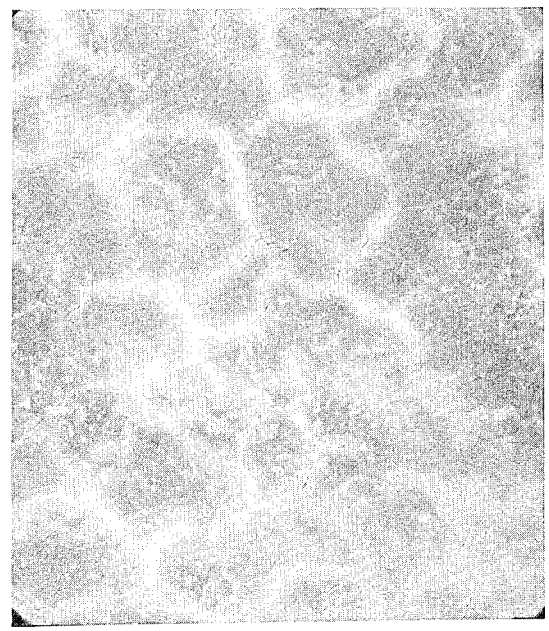

FIG. 1 is a photograph illustrating the cracks or porosity present in a typical barrier coating applied to a carbon-carbon composite, and FIG. 2 illustrates a carbon-carbon composite and barrier coating after the penetrant has been applied.

The overall objective of the invention is to protect carbon-carbon composites from oxidation in an atmospheric environment at elevated temperatures. The invention provides a method and article wherein a barrier coating is applied to the carbon-carbon composite in order to block diffusion of oxygen to the carbon-carbon composite surface in combination with a liquid penetrant to prevent oxidation through cracks or porous areas in the barrier coating. The preparation and testing of the coated materials is as follows:

Carbon-carbon Substrate

The carbon-carbon composites utilized consist of random chopped, intermediate modulus PAN precursor carbon fibers in a matrix of phenolic/furfuryl resin char and CVD carbon. Test specimens utilized for oxidation tests were 2.0"×1.5"×0.2" specimens that were machined from larger parts.

Barrier Coatings

Test specimens were coated on all surfaces with barrier coatings. All barrier coatings were approximately 5–10 mils thick. Table I below provides a general description of the coatings that were evaluated. Six of the seven coatings were based on SiC and one was based on a Sn-Ni alloy. All of the SiC coatings were cracked. There were hairline cracks uniformly distributed over the entire coating surface as illustrated by FIG. 1.

TABLE I
BARRIER COATINGS

| Coating Designation | Coating Description |
|---|---|
| A | Chemical vapor reaction (CVR) of carbon-carbon surface to form SiC |
| B | Chemical vapor disposition (CVD) of SiC on carbon-carbon surface |
| C | CVD of carbon at carbon-carbon surface graded to SiC at coating surface |
| D | Pyrolytic graphite (PG) coating on carbon-carbon surface which is converted to SiC by CVR, followed by CVD SiC coating |
| E | 92% Wt. Sn and 8% Wt. Ni alloy coating |

Penetrant Application

Aqueous penetrant solutions of the compositions shown in Table II below were applied to coated and uncoated oxidation test specimens by dipping, drying, and heating to 900° C. in a nitrogen atmosphere. Penetrant E is a solution that has been used on commercial carbon composite brake discs but without the utilization of a barrier coating. Penetrant F is based on the disclosure of NASA TN D-7688, June 1974, "*Effect of Chlorine Purification on Oxidation Resistance of Some Mechanical Carbons*" by D. W. Wisander and G. P. Allen. Penetrant G is based on the solution disclosed in U.S. Pat. No. 3,713,882.

TABLE II
PENETRANT SOLUTIONS
(% by weight of solution)

| Penetrant Designation | $H_2O$ Wt. % | $H_3PO_4$, 85% Wt. % | $MnHPO_4.6H_2O$ Wt. % | $AlH_2PO_4$, 50% Wt. % | $B_2O_3$ Wt. % | $Zn_3PO_4$ Wt. % |
|---|---|---|---|---|---|---|
| A | 22.0 | 36.8 | 5.7 | 26.8 | 1.8 | 6.9 |
| B | 27.7 | 46.3 | 3.6 | 16.9 | 1.1 | 4.3 |
| C | 29.6 | 49.5 | 2.9 | 13.6 | 0.9 | 3.5 |
| D | 31.9 | 53.2 | 2.1 | 9.7 | 0.6 | 2.5 |
| E | 30.1 | 50.3 | — | 18.4 | 1.2 | — |
| F | 37.0 | 61.9 | — | — | — | 1.1 |
| G | 32.6 | 54.4 | 13.0 | — | — | — |

Oxidation Testing

The test specimens were place in a stainless steel wire basket and separated by stainless steel wire dividers to ensure adequate exposure to the oxidizing environment. The basket was hung in the center of a furnace for testing, the test being carried out at 650° C. (1200° F.) in 2 CFH shop air. The test specimens were removed at 6–58 hour intervals and cooled to ambient temperature in a desiccator. Weight loss in $mg/cm^2$ was calculated for each test interval and for the total exposure time.

Oxidation Test Results

Oxidation test results are presented in Table III below. The data shows that penetrant B by itself is a more effective inhibitor than any of the barrier coatings. However, when penetrant B is used in conjunction with the barrier coatings (see FIG. 2), extremely low oxidation rates are obtained for the testing conditions used for this evaluation.

TABLE III
OXIDATION TEST DATA FOR COATED CARBON/CARBON

| Barrier Coating | Penetrant | Total Exposure at 1200° F. in Air (hrs) | Avg. Oxid. Rate ($mg/cm^2/hr$) | Oxidation Rate (Last 6 hrs) $mg/cm^2/hr$. |
|---|---|---|---|---|
| None | None | 8 | 18.4 | — |
| None | B | 30 | 0.4 | 1.0 |
| A | None | 30 | 7.5 | 6.8 |
| A | B | 42 | 0.4 | 0.9 |
| B | None | 18 | 3.2 | 4.6 |
| B | B | 30 | 0.1 | 0.1 |
| C | B | 42 | 0.1 | 0.2 |
| D | None | 36 | 6.3 | — |
| D | B | 42 | 0.05 | 0.03 |
| E | None | 18 | 2.3 | 6.1 |
| E | B | 24 | 0 | 0 |

Additional oxidation tests were performed to evaluate the penetrant formulations shown in Table II when the formulations were applied to carbon-carbon specimens coated with barrier coating B (CVD SiC) of Table I. Table IV presents the test results which show that a penetrant formulation effectively improves oxidation protection (as shown in Table III), and when used in combination with a barrier coating, significant oxidation protection is attained. The best performing penetrants (A–D and G) contain manganese phosphate. It is foreseen that the penetrant formulation may comprise the following ranges:

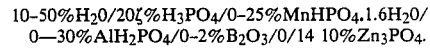

$10-50\% H_2O/20\% H_3PO_4/0-25\% MnHPO_4.1.6H_2O/$
$0-30\% AlH_2PO_4/0-2\% B_2O_3/0/14 \ 10\% Zn_3PO_4$.

TABLE IV
OXIDATION TEST DATA FOR CARBON/CARBON COATED WITH BARRIER COATING B AND TREATED WITH VARIOUS PENETRANTS

| Penetrant | Total Exposure at 1200° F. in Air (hrs.) | Average Oxidation Rate ($mg/cm^2/hr$) | Oxidation Rate (Last 58 hrs) ($mg/cm^2/hr$.) |
|---|---|---|---|
| None | 42 | 4.8 | * |
| A | 100 | 0.08 | 0.12 |
| B | 100 | 0.04 | 0.06 |
| C | 100 | 0.005 | 0.006 |
| D | 100 | 0.02 | 0.03 |
| E | 100 | 1.2 | 1.8 |
| F | 100 | 1.2 | 1.7 |
| G | 100 | 0.18 | 0.28 |

*Test discontinued - coating flaked off at 42 hours.

The prior methods utilized for protecting carbon-carbon composites and other carbon/graphite materials from oxidation include barrier coatings to exclude oxygen or inhibitors that form stable complexes with active sites on the carbon surfaces. The barrier coatings suffer from cracks that form during cool down from the application process temperatures and/or thermal cycling. Oxidation of the carbon-carbon substrate occurs at the crack or porosity sites. The inhibitors do not completely exclude oxygen from the inner porosity of the carbon-carbon. Eventually, oxygen will diffuse into the carbon-carbon composite and cause oxidation.

This invention provides a method and article that utilizes the inherent oxygen-blocking characteristics of a barrier coating by penetrating the cracks or porous areas of the coating with an oxygen inhibitor. The inhibitor will complex with active carbon sites on the composite at the base of the cracks. The resulting system provides very effective oxidation protection.

The present invention may be utilized to protect carbon-carbon aircraft brake discs from oxidation. Frictional heat generated during the application of the brakes causes oxidation of the carbon-carbon discs. This oxidation occurs primarily at exposed non-friction surfaces. Inhibition of oxidation will extend the structural life of the discs. The invention may be utilized for other applications where carbon-carbon must be protected from oxidation. Some of these applications include components for the hot sections of gas turbine engines, rocket motor components, and hot structures for missiles and exoatmospheric transportaton vehicles.

While the invention has been described with respect to the detailed examples, it will be understood that the invention is capable of numerous rearrangements, modifications, and alterations, and such are intended to be within the scope of the appended claims.

We claim:

1. A fiber-reinforced carbon-carbon composite article adapted to resist environmental degradation, which comprises:
   a. a fiber-reinforced carbon-carbon composite substrate,
   b. a barrier coating of material that is thermally mismatched with the substrate and added to prevent oxidation, the coating having cracks exposing areas of the fiber-reinforced carbon-carbon composite substrate as a result of the thermal mismatch, the barrier coating comprising 92% by weight of tin and 8% by weight of nickel alloy, and
   c. a penetrant which enters the cracks and protects the exposed areas of fiber-reinforced carbon-carbon composite substrate from environmental degradation.

2. The article in accordance with claim 1, wherein the barrier coating has a thickness of about 5 to about 10 mils.

3. The article in accordance with claim 1, wherein the penetrant comprises a phosphoric acid solution in the weight ratios of: such that the total weight of the solution components is 100%.

4. A fiber-reinforced carbon-carbon composite article adapted to resist environmental degradation, which comprises:
   a. a fiber-reinforced carbon-carbon composite substrate,
   b. a barrier coating of material that is thermally mismatched with the substrate and added to prevent oxidation, the thermal mismatch causing the coating to have porosity providing exposed areas of the fiber-reinforced carbon-carbon composite substrate, the barrier coating comprising 92% by weight of tin and 8% by weight of nickel alloy, and
   c. a penetrant which eliminates the porosity and protects the exposed areas of the fiber-reinforced carbon-carbon composite substrate.

5. The article in accordance with claim 4, wherein the barrier coating has a thickness of about 5 to about 10 mils.

6. The article in accordance with claim 4, wherein the penetrant comprises a phosphoric acid solution in the weight ratios of:

10–50%$AlH_2O$/20–70%$H_3PO_4$/0–25%M-n$PO_4.1.6H_2O$/
0—30%$AlH_2PO_4$/0–2%$B_2O_3$/0–10% $Zn_3PO_4$ such that the total weight of the solution components is 100%.

7. A method for forming a coating on a fiber-reinforced carbon-carbon composite substrate and for protecting the composite substrate from environmental degradation, comprising:
   (a) applying a layer of 92% by weight tin and 8% by weight nickel alloy to the fiber-reinforced carbon-carbon composite substrate, the layer being thermally mismatched with the composite substrate,
   (b) heating the layer in order to effect drying and adhesion of the layer, the dried layer having cracks therein as a result of the thermal mismatch and which may expose areas of the composite substrate,
   (c) applying a penetrant which enters the cracks and protects the areas from environmental degradation, and
   (d) drying and heating the penetrant so that said penetrant forms a metallic oxide glass composition.

8. The method in accordance with claim 7, wherein the penetrant comprises a phosphoric acid solution in the weight ratios of:

10–50%$AlH_2O$/20–70%$H_3PO_4$/0–25%M-n$PO_4.1.6H_2O$/
0—30%$AlH_2PO_4$/0–2%$B_2O_3$/0–10% $Zn_3PO_4$ such that the total weight of the solution components is 100%.

* * * * *

UNITED STATES PATENT AND TRADEMARK OFFICE
CERTIFICATE OF CORRECTION

PATENT NO. : 4,837,073
DATED : June 6, 1989
INVENTOR(S) : LAWRENCE EDWARD MC ALLISTER; NORMAN EUGENE JANNASCH It is certified that error appears in the above–identified patent and that said Letters Patent is hereby corrected as shown below:

Column 4, line 31, that portion of the formula reading: "20%$H_3PO_4$" should read -- 20-70%$H_3PO_4$ --.

Column 4, line 32, that portion of the formula reading: "0/14 10% $Zn_3PO_4$" should read -- 0-10% $Zn_3PO_4$ --.

Claim 3, line 3, after "of:" insert
-- 10-50% $H_2O$/20-70%$H_3PO_4$/0-25% $MnPO_4 \cdot 1.6H_2O$/
0-30%$AlH_2PO_4$/0-2%$B_2O_3$/0-10%$Zn_3PO_4$ --

Claims 6 and 8, line 4, that portion of the formula reading: "10-50%$AlH_2O$" should read -- 10-50%$H_2O$ --.

Signed and Sealed this

Seventeenth Day of July, 1990

Attest:

HARRY F. MANBECK, JR.

*Attesting Officer*    *Commissioner of Patents and Trademarks*